United States Patent [19]
Munnerlyn et al.

[11] 3,836,238
[45] Sept. 17, 1974

[54] VIEWABLE TARGET SYSTEM FOR EYE EXAMINING INSTRUMENT

[75] Inventors: Charles R. Munnerlyn; William H. Trow, both of Fairport, N.Y.

[73] Assignee: Tropel, Inc., Fairport, N.Y.

[22] Filed: May 9, 1973

[21] Appl. No.: 358,824

[52] U.S. Cl..................... 351/36, 351/37, 351/38, 351/39
[51] Int. Cl............................................... A61b 3/02
[58] Field of Search............ 351/32, 36, 37, 38, 39, 351/28, 29, 17, 31; 350/145

[56] References Cited
UNITED STATES PATENTS
2,723,591  11/1955  Taylor.................................. 351/31
2,826,114  3/1958  Bryan............................ 350/145 X FOREIGN PATENTS OR APPLICATIONS
189,981  9/1906  Germany .............................. 351/17

*Primary Examiner*—Paul A. Sacher
*Attorney, Agent, or Firm*—Cumpston, Shaw & Stephens

[57] ABSTRACT

To induce the eyes to deaccommodate during examination by an instrument having an optical system aligned with one eye, a target viewable through an eyepiece is presented to and aligned with the other eye. The target is adjusted until clearly visible and then moved straight away from the other eye to appear to recede to induce both eyes to deaccommodate. A pair of eyepieces are arranged on each side of the optical system to register with the eye not being examined, and a horizontally movable slide carrying a slidable target is operated by knobs for aligning the slide with the eye and moving the target along the slide. Alternatively, a binocular system can be used with a slightly blurred target presented to the eye not being examined, and a visibly lighted, sharp image target presented to the eye being examined and arranged to be blurred to induce de-accommodation of the examined eye.

30 Claims, 9 Drawing Figures

PATENTED SEP 17 1974

VIEWABLE TARGET SYSTEM FOR EYE EXAMINING INSTRUMENT

THE INVENTIVE IMPROVEMENT

Some eye examinations require the eye to deaccommodate or to gaze at infinity in an unaccommodated state, and this is particularly true for objective measurement of the refractive error of the eye. However, the subject is aware of looking into an instrument close at hand, and may accommodate his eyes to a nearer focus and impair the examination. Also, far-sighted people accommodate to some extent even in gazing at infinity. The invention proposes a way of inducing the examined eye to deaccommodate by proper presentation of viewable targets. The invention aims at simplicity, effectiveness, reliability, and convenient operation in a viewable target system for eye examination.

SUMMARY OF THE INVENTION

The inventive target system applies to an eye examining instrument having an optical system aligned with an eye being examined. It includes an eyepiece on each side of the optical system and a slide associated with each eyepiece. A target is slidably mounted on each of the slides and viewable respectively through the eyepieces by an eye not being examined. The slides are horizontally adjustable for optically aligning the paths of the targets respectively with the eye not being examined, and the targets are movable along the paths on the respective slides. A target is presented to the eye not being examined and is adjusted until clearly visible and then the target is moved straight away from the eye not being examined to appear to recede to induce both eyes into an unaccommodated state for the examination.

Alternatively, a target having a slightly blurred image is presented to the eye not being examined, and a target having a sharp image is viewable by the eye being examined by light transmitted along the optical path of the instrument for binocular viewing, and the sharp image target is then made to appear slightly blurred to induce deaccommodation.

DRAWINGS

DETAILED DESCRIPTION

Figure 1:
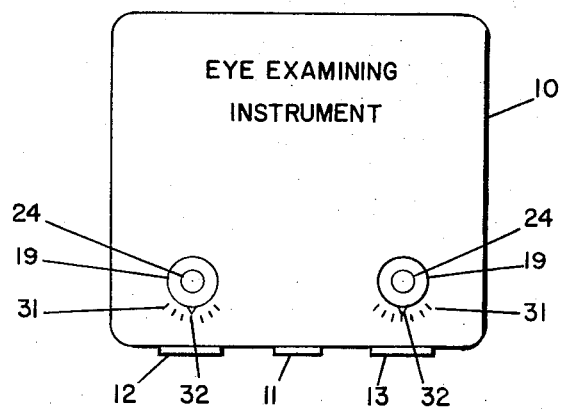
FIG. 1 is a schematic plan view of a preferred embodiment of the inventive target system.
Figure 2:
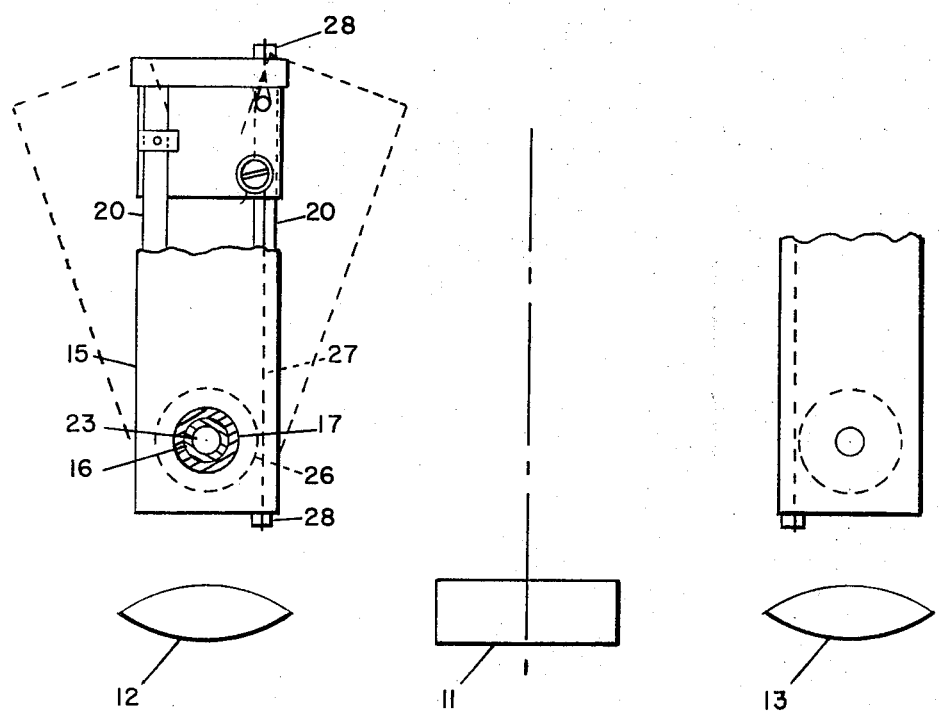
FIG. 2 is a fragmentary, partially schematic view of the operation of the target system of FIG. 1.
Figure 3:
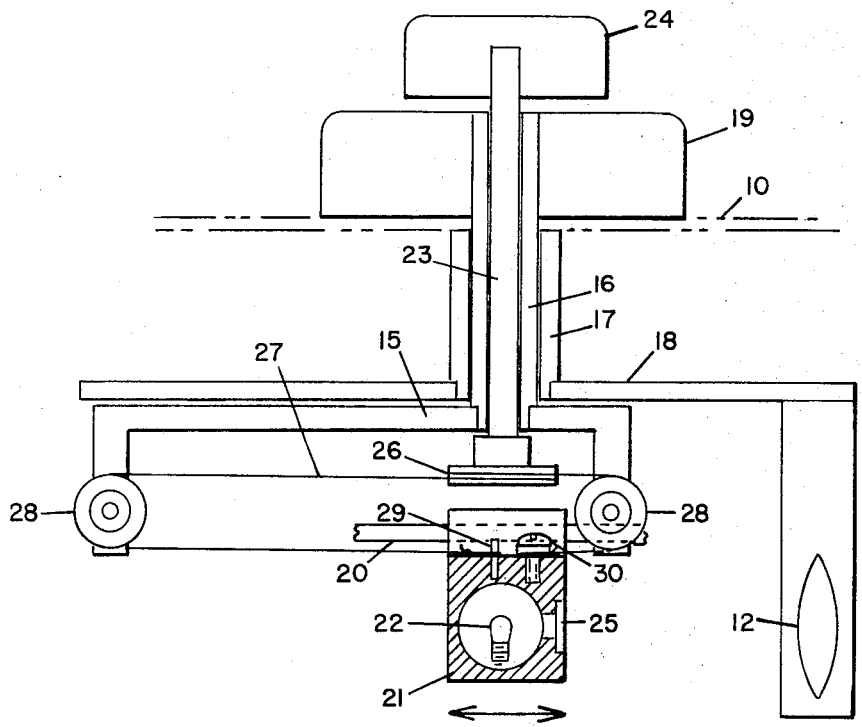
FIG. 3 is a fragmentary, elevational view of the target system of FIG. 2.

The invention applies to an instrument 10 requiring the eyes to deaccommodate or to gaze at infinity during an eye examination. One example of such an instrument is an objective refractor for measuring refractive error of an eye, but the invention applies to any instrument 10 that requires deaccommodation while one eye is examined.

Instrument 10 has an optical system for directing light through an eyepiece 11 on to an eye being examined and for detecting or monitoring the light reflected back through eyepiece 11 from the eye being examined. The optical system and eyepiece 11 are aligned with the eye being examined, and eyepieces 12 and 13 are arranged on each side of eyepiece 11 to confront the other eye not being examined. Then if the right eye is being examined, the left eye looks through eyepiece 12, and if the left eye is being examined, the right eye looks through eyepiece 13. Eyepieces 12 and 13 are preferably large enough to be used by the eye not being examined regardless of the interpupillary distance from the eye being examined.

A slide 15 is arranged behind each of the eyepieces 12 and 13 and is secured to a sleeve 16 that is pivotally mounted within a fixed sleeve 17 secured to a plate 18. A knob 19 on sleeve 16 is mounted over the top of instrument 10 for pivotally adjusting slide 15 by turning sleeve 16. The vertical pivot axes for sleeves 16 respectively intersect the focal points of eyepieces 12 and 13 so that slides 15 pivot respectively about the focal points of eyepieces 12 and 13.

Slides 15 have a pair of longitudinal slide bars 20 supporting a carriage 21 for moving along bars 20. Carriage 21 supports an internal light source 22 for back illuminating a target 25 viewable through eyepiece 12 or 13.

A shaft 23 supported inside of sleeve 16 and having a knob 24 turns a pulley 26 wrapped with a cable 27 reeved around a pair of pulleys 28 carried on slide 15. The ends of cable 27 are secured to carriage 21 by a stake 29 and a screw 30. Then as knob 24 turns pulley 26, cable 27 moves carriage 21 along slide bars 20 to adjust the distance of target 25 from eyepiece 12 or 13.

Scales 31 are arranged adjacent knobs 19 on instrument 10 so that knobs 19 can be turned to set pointers 32 to numbers on scales 31 representing a measured interpupillary distance between the eyes of the subject being examined. Such a setting automatically aligns a slide 15 with the eye not being examined, when instrument 10 is aligned with an eye being examined. Then as target 25 moves along slide 15, its path of movement is optically aligned with the eye not being examined so that the target appears to move closer or recede without moving laterally. Pivoting of the target path around the focal point of the eyepiece accomplishes this regardless of any eccentricity of the targetviewing eye relative to eyepieces 12 and 13.

Figure 5:
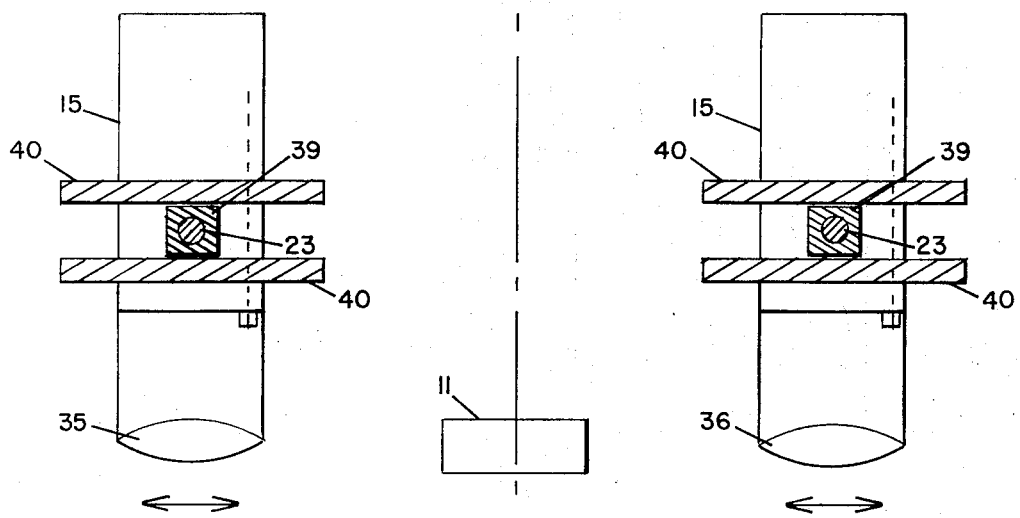
FIG. 5 is a fragmentary, partially schematic view of the operation of the target system of FIG. 4.
Figure 4:
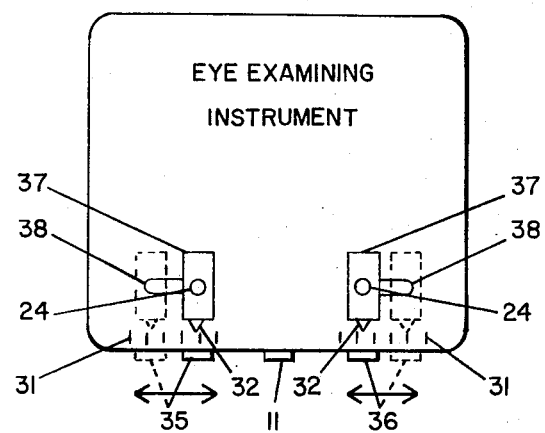
FIG. 4 is a schematic plan view of another preferred embodiment of the inventive target system.

Eye examining instrument 10 of FIG. 4 is the same as instrument 10 of FIG. 1 except for a somewhat different target aligning arrangement. Instead of pivoting the target paths around the focal points of fixed eyepieces, the target system of FIGS. 4 and 5 has eyepieces 35 and 36 that are fixed relative to slides 15 for lateral horizontal movement relative to eyepiece 11 and the optical system of instrument 10 as indicated by the arrows.

Each of the slides 15 then remains parallel with the optical system of instrument 10 during lateral adjustment which is accomplished by knobs 37 laterally moving in slots 38 and having pointers 32 moving along scales 31. Target moving knobs 24 move along with knobs 37 and turn shaft 23 to pulley 26 as previously described. Instead of cylindrical sleeves 16 supporting slides 15, sleeves 39 having square exteriors slide between lateral walls 40 for moving slides 15 laterally with knobs 37.

In operation, a subject is positioned in front of instrument 10, and the optical system and eyepiece 11 are aligned with an eye to be examined. The other eye then looks through eyepiece 12 or 13, or 35 or 36, at a target 25. Either by measuring the interpupillary distance of the subject's eyes and setting pointers 32 to the measured value on scales 31, or by aiming a pointer 32 toward the target-viewing eye, an operator effectively aligns a target slide 15 with the eye not being examined. The operator then adjusts knob 24 to position target 25 where the subject reports that the target is clearly visible. Then the operator turns knob 24 to move target 25 straight away from the subject far enough to make target 25 slightly blurred. This induces the target-viewing eye into an unaccommodated state to gaze at infinity in attempting to view target 25. The same thing happens to the eye being examined even though it cannot view target 25, and the eye being examined also is induced into an unaccommodated state to gaze at infinity. Then the examination is made by instrument 10 and the process repeated on the other eye.

Many different targets and target illuminations can be used, and a miniature standard eye chart is satisfactory. Many different arrangements of slides, knobs and target movements are also possible.

In the arrangements of FIGS. 1 – 5, only the eye not being examined sees a target, but the reaction of this eye helps induce deaccommodation of the eye being examined. A true binocular arrangement is also possible as shown in FIGS. 6 – 9. This has several advantages in that a target viewable by the eye being examined can be manipulated to induce deaccommodation directly in the eye being examined, with assistance with the eye not being examined. Also, moving a target viewed by the eye being examined is relatively simple because the eye examining instrument is already aligned with this eye. The eye not being examined can then view a simple, fixed target.

Figure 6:
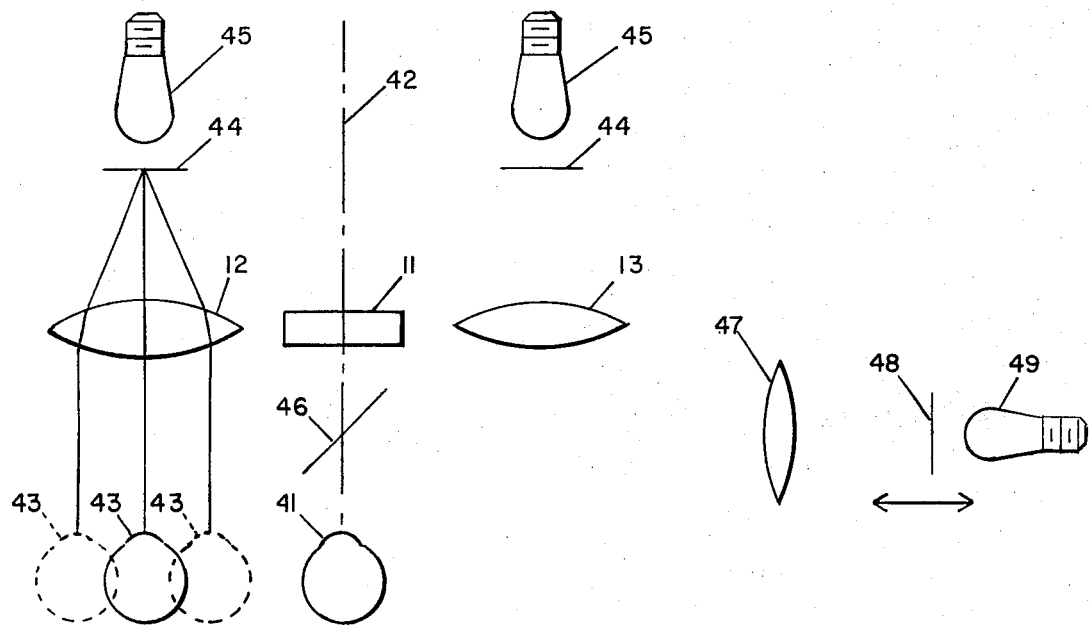
FIG. 6 is a schematic view of the inventive target viewing system of a binocular form.

A binocular system is generally shown schematically in FIG. 6 where the eye 41 being examined is aligned with eyepiece 11 on optical axis 42, and the eye 43 not being examined is observing a fixed target 44 through eyepiece 12. Target 44 is visibly illuminated by a lamp 45 and is located at the focal point of eyepiece lens 12. Eyepiece 12 is also relatively large so that eye 43 can view target 44 regardless of the interpupilary distance from eye 41 as shown in broken lines.

Target 44 has a slightly blurred image to induce eye 43 to deaccommodate in an attempt to make target 44 clearly visible. A simple way of making target 44 is by photographing an eye chart or other viewable target with a camera focused at a nearer distance from the target so that the photograph is slightly out of focus. A pair of targets 44 and lamps 45 are arranged for viewing by the eye not being examined through eyepieces 12 and 13.

A beam splitter 46 is arranged on optical axis 42, and a lens 47, target 48, and lamp 49 are arranged off the optical axis so that target 48 can be viewed by eye 41. Visible light from lamp 49 illuminates target 48, and a portion of such light is directed into eye 41 by beam splitter 46. Target 48 corresponds to targets 44 except that target 48 has a sharp image rather than a blurred image. Target 48 is movable as indicated by the arrows so it can be positioned where it appears slightly blurred to eye 41 to deaccommodate. Targets 44 and 48 are viewed binocularly by eyes 43 and 41 and appear to be at a distance. If eye 41 is nearsighted, deaccommodation occurs simply, but if eye 41 is farsighted, it accommodates to some extent even to gaze at objects at infinity. However, if target 48 is positioned where it appears slightly blurred, eye 41 tends to deaccommodate even if it is farsighted.

Figure 7:
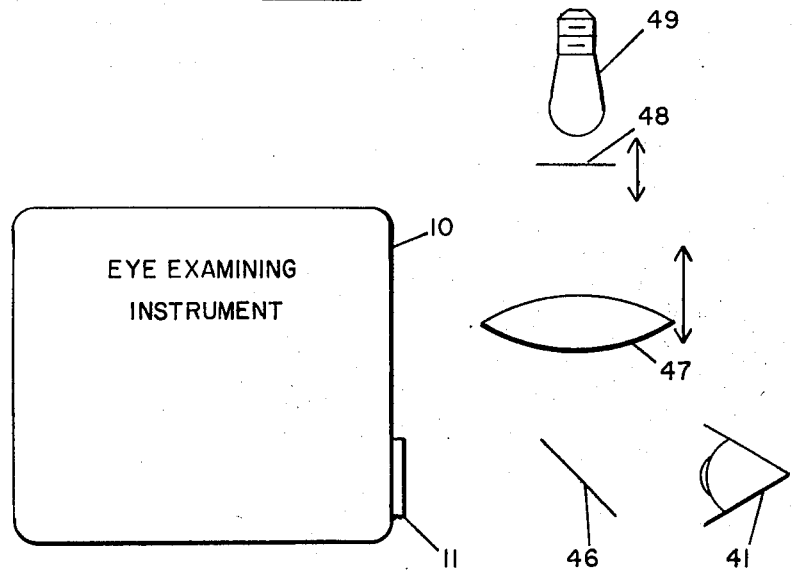
FIG. 7 is a schematic view of another binocular form of the inventive target viewing system.

Blurring of target 48 can be done by moving target 48 along its light path, or by moving lens 47 as shown by the arrows in FIG. 7. Movable target 48 is preferably arranged vertically relative to instrument 10 as shown in FIG. 7.

Figure 8:
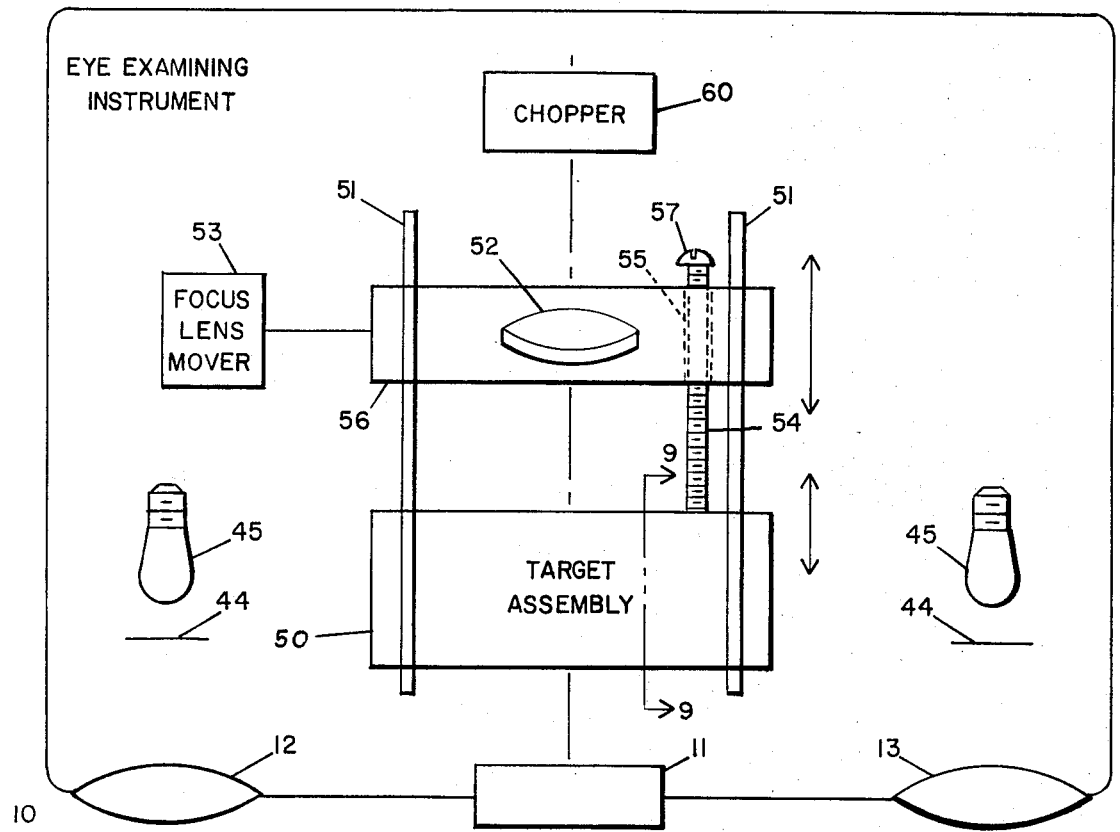
FIG. 8 is a schematic view of another binocular form of the inventive target viewing system built into an eye-examining instrument.

A similar binocular arrangement is shown in FIG. 8 as built in to eye examining instrument 10. Target assembly 50 is supported on guide rails 51 which also support a movable focusing lens 52 in a frame 56 positioned by a focus lens mover 53 for examination purposes. Assembly 50 is coupled to focusing lens 52 by a screw 54 passing loosely through a hole 55 in focusing lens frame 56 and having a head 57. Screw 54 is threaded into target assembly 50 to adjust the maximum possible separation of focusing lens 52 and target assembly 50. As focusing lens 52 moves away from target assembly 50, it engages screw head 57 and moves target assembly 50 along guide rails 51. Focusing lens 52 can move freely toward target assembly 50, because the threads of screw 54 do not engage hole 55.

Figure 9:
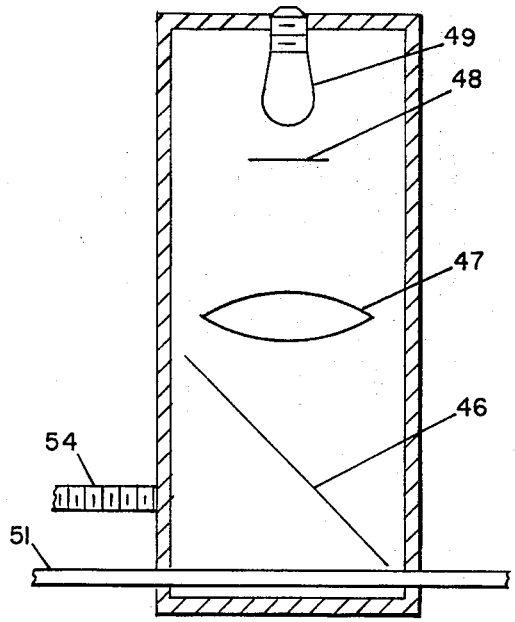
FIG. 9 is a partially schematic, cross-sectional view of the target assembly of the embodiment of FIG. 8, taken along the line 9 — 9 thereof.

As shown in FIG. 9, target assembly 50 contains beam splitter 46, lens 47, target 48, and lamp 49. Beam splitter 46 can introduce astigmatism error, but to minimize this, beam splitter 46 is preferably made as thin as possible.

One practical use for the inventive target viewing system is in an instrument for objectively measuring the refractive error of the eye, and such an instrument preferably uses infra red light. One way to achieve this is to filter out the visible portion of light from a tungsten filament lamp, but experience has shown that the resulting infra red light has a visible component so that the eye being examined sees a red spot. Lamps 45 and 49 then preferably produce visible red light so that targets 44 and 48 are illuminated by red lights and are compatible with the red spot produced by instrument 10. Light from lamp 49 can be excluded from the detector monitoring the reflected infra red light in several ways. First, the detector of instrument 10 preferably responds substantially only to infra red light and is not sensitive to visible red light from lamp 49. Second, the infra red light used in instrument 10 is preferably chopped at a predetermined frequency by a chopper 60, and the light from lamp 49 is steady illumination producing a DC signal that is filtered out. Also, the optical system is generally designed to absorb as much of the stray light as possible from lamp 49.

In operation, the eye not being examined views a blurred image target 44 through an eyepiece 12 or 13, and the eye being examined views sharp image target 48 in assembly 50. Assembly 50 is placed in an initial starting position, and focusing lens 52 starts relatively close to target assembly 50 and moves away from target assembly 50 to produce an optimum focus of the reflected light. If the eye being examined is nearsighted, such an optimum focus occurs within the maximum separation of focusing lens 52 and target assembly 50, so that target assembly 50 remains in its initial position. To a nearsighted eye, target 48 appears slightly blurred when target assembly 50 is in its initial position, and hence the eye being examined tends to deaccommodate naturally.

If the eye being examined is farsighted, then optimum focus does not occur until after focusing lens frame 56 engages screw head 57 and draws target assembly 50 along guide rails 51. Such movement of target assembly 50 eventually causes target 48 to appear blurred even to the farsighted eye being examined which then deaccommodates so that the examination of its refractive error can be made in a deaccommodated state.

Many different target mountings, target or lens moving mechanisms, couplings, illumination devices, etc. are all possible within the spirit of the invention as will be understood by those skilled in the art. Target assembly 50 can be coupled to moving elements other than a focusing lens, and the inventive target viewing system can be applied to many eye examining instruments requiring deaccommodation of the eye being examined.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will appreciate the variations possible in adapting the invention to specific eye-examining instruments.

I claim:

1. A viewable target system for an eye-examining instrument having an optical system aligned with an eye being examined, said target system comprising:
   a an eyepiece on each side of said optical system;
   b a slide associated with each respective one of said eyepieces;
   c respective targets slidably mounted on each of said slides and viewable respectively through said eyepieces by an eye not being examined;
   d means for horizontally adjusting each of said slides for optically aligning the paths of said targets respectively with said eye not being examined; and
   e means for moving each of said targets along said paths on respective ones of said slides.

2. The target system of claim 1 wherein said target moving means includes pulleys and a cable secured to each of said slides.

3. The target system of claim 1 wherein said eyepieces are fixed relative to said optical system of said instrument, and said slide adjusting means provides horizontal pivotal motion of said slides on vertical axes respectively intersecting the focal points of said eyepieces to provide said optical alignment of said target paths.

4. The target system of claim 3 wherein said eyepieces are large enough to accommodate substantially the entire range of interpupilary distance between human eyes.

5. The target system of claim 4 wherein said means for adjusting said slides and said means for moving said targets include respective coaxial knobs.

6. The target system of claim 5 wherein said target moving means includes pulleys and a cable secured to each of said slides.

7. The target system of claim 6 including respective scales adjacent each of said slide adjusting knobs for setting said slides to conform to a measured interpupillary distance between said eye being examined and said eye not being examined.

8. The target system of claim 7 including respective light sources illuminating each of said targets.

9. A method for inducing an eye being examined to deaccommodate during examination by an instrument having an optical system aligned with said eye being examined, said method comprising:
   a. presenting a target to the other eye not being examined, said target being viewable through an eyepiece beside said optical system;
   b. adjusting the distance of said target from said eyepiece so said target is clearly visible to said eye not being examined; and
   c. moving said target optically straight away from said eye not being examined so said target appears to recede to induce said eye not being examined to deaccommodate and thereby induce said eye being examined to deaccommodate.

10. The method of claim 9 including horizontally pivotally adjusting said target around the focal point of said eyepiece for optically aligning the path of said target with said eye not being examined so said target moves optically straight away from said eye not being examined.

11. A method of inducing an eye being examined to deaccommodate during examination by an instrument having an optical system aligned with said eye being examined, said method comprising:
   a. forming a pair of corresponding targets, one of said targets having a slightly blurred image, and one of said targets having a sharp image;
   b. fixing said blurred image target in a place to be viewed by the eye not being examined through an eyepiece beside said optical system;
   c. arranging said sharp image target to be viewed by said eye being examined by light transmitted along said optical system, said eyes viewing said targets binocularly; and
   d. making said sharp image target appear slightly blurred to induce said deaccommodation.

12. The method of claim 11 including moving said sharp image target for making said sharp image target appear slightly blurred.

13. The method of claim 12 including using a movable element in said instrument for moving said sharp image target.

14. A viewable target system for an eye examining instrument having an optical system aligned with an eye being examined, said target system comprising:
   a. an eyepiece on each side of said optical system;
   b. a pair of identical, slightly blurred image targets mounted respectively at the focal points of said eyepieces and viewable by an eye not being examined;

c. a sharp image target corresponding with said blurred image targets;

d. optical means for making said sharp image target viewable by said eye being examined by light transmitted along said optical system, said sharp image target and said blurred image target being arranged to be viewed binocularly; and e. means for varying said optical means for making said sharp image target appear slightly blurred to induce said eye being examined to deaccommodate.

15. The target system of claim 14 wherein said instrument has a source of infra red light for said examination, and said target system includes sources of visible light for illuminating each of said targets.

16. The target system of claim 15 including means for chopping said infra red light for said examination at a predetermined frequency, and wherein said visible light for illuminating said targets is continuous and uninterrupted.

17. The target system of claim 16 wherein said visible light for illuminating said targets is red.

18. The target system of claim 14 wherein said optical means for making said sharp image target viewable includes a beam splitter on the axis of said optical system for directing said visible light along said optical system axis and a lens for viewing said sharp image target.

19. The target system of claim 14 wherein said eyepieces are large enough to accommodate substantially the entire range of interpupilary distance between human eyes.

20. The target system of claim 14 wherein said sharp image target is movable for said varying of said optical means.

21. The target system of claim 20 wherein said optical means for making said sharp image target viewable includes a beam splitter on the axis of said optical system for directing said visible light along said optical system axis and a lens for viewing said sharp image target.

22. The target system of claim 21 wherein said instrument has a source of infra red for said examination, and said target system includes sources of visible light for illuminating each of said targets.

23. The target system of claim 22 wherein said eyepieces are large enough to accommodate substantially the entire range of interpupilary distance between human eyes 24. The target system of claim 21 wherein said instrument includes a slide for a movable element in said eye examining instrument, and said beam splitter, lens and sharp image target are mounted in an assembly movable on said slide.

25. The target system of claim 24 including a coupling arranged so said movable element can vary the position of said assembly on said slide as said movable element moves on said slide.

26. The target system of claim 25 wherein said coupling is a headed rod secured to said assembly and limiting the maximum separation between said assembly and said movable element.

27. The target system of claim 25 wherein said instrument has a source of infra red light for said examination, and said target system includes sources of visible light for illuminating each of said targets.

28. The target system of claim 27 wherein said eyepieces are large enough to accommodate substantially the entire range of interpupilary distance between human eyes.

29. The target system of claim 28 wherein said coupling is a headed rod secured to said assembly and limiting the maximum separation between said assembly and said movable element.

30. The target system of claim 29 including means for chopping said infra red light for said examination at a predetermined frequency, and wherein said visible light for illuminating said targets is red.

* * * * *